(12) United States Patent
Martini

(10) Patent No.: US 7,746,373 B2
(45) Date of Patent: Jun. 29, 2010

(54) DEVICE FOR VIEWING IMAGES, SUCH AS FOR VIDEOCONFERENCE FACILITIES, RELATED SYSTEM, NETWORK AND METHOD OF USE

(75) Inventor: Giovanni Martini, Turin (IT)

(73) Assignee: Telecom Italia S.p.A., Milan (IT)

( * ) Notice: Subject to any disclaimer, the term of this patent is extended or adjusted under 35 U.S.C. 154(b) by 1040 days.

(21) Appl. No.: 10/584,080

(22) PCT Filed: Dec. 23, 2003

(86) PCT No.: PCT/IB03/06152

§ 371 (c)(1),
(2), (4) Date: Jun. 22, 2006

(87) PCT Pub. No.: WO2005/071955

PCT Pub. Date: Aug. 4, 2005

(65) Prior Publication Data

US 2009/0015656 A1 Jan. 15, 2009

(51) Int. Cl.
*H04N 7/14* (2006.01)
(52) U.S. Cl. .................................. 348/14.01; 370/260
(58) Field of Classification Search ... 348/14.01–14.06; 353/94; 347/239, 241, 244; 370/261–262
See application file for complete search history.

(56) References Cited

U.S. PATENT DOCUMENTS

| 3,692,934 | A | 9/1972 | Herndon |
| 6,208,369 | B1* | 3/2001 | Oren et al. ................... 347/244 |
| 6,515,696 | B1 | 2/2003 | Driscoll, Jr. et al. |
| 6,539,547 | B2 | 3/2003 | Driscoll, Jr. et al. |
| 6,550,921 | B1 | 4/2003 | Monson |
| 6,644,816 | B1 | 11/2003 | Perra et al. |
| 2001/0040671 | A1* | 11/2001 | Metcalf ....................... 353/94 |
| 2002/0021353 | A1 | 2/2002 | DeNies |

FOREIGN PATENT DOCUMENTS

| DE | 27 46 530 | 4/1979 |
| EP | 0 695 085 A1 | 1/1996 |
| EP | 1 220 017 A1 | 7/2002 |
| JP | 7-135646 | 5/1995 |

* cited by examiner

*Primary Examiner*—Curtis Kuntz
*Assistant Examiner*—Maria El-Zoobi
(74) *Attorney, Agent, or Firm*—Finnegan, Henderson, Farabow, Garrett & Dunner, L.L.P.

(57) ABSTRACT

A device for viewing images, for example, for videoconference facilities, has a substantially continuous viewing surface having a plurality of directions of frontal observation distributed in continuous fashion in an angular field of observation. Preferably, the angular field of observation is no smaller than 180°, and in particularly preferred fashion, it is substantially equal to 360°.

27 Claims, 4 Drawing Sheets

Figure 4:
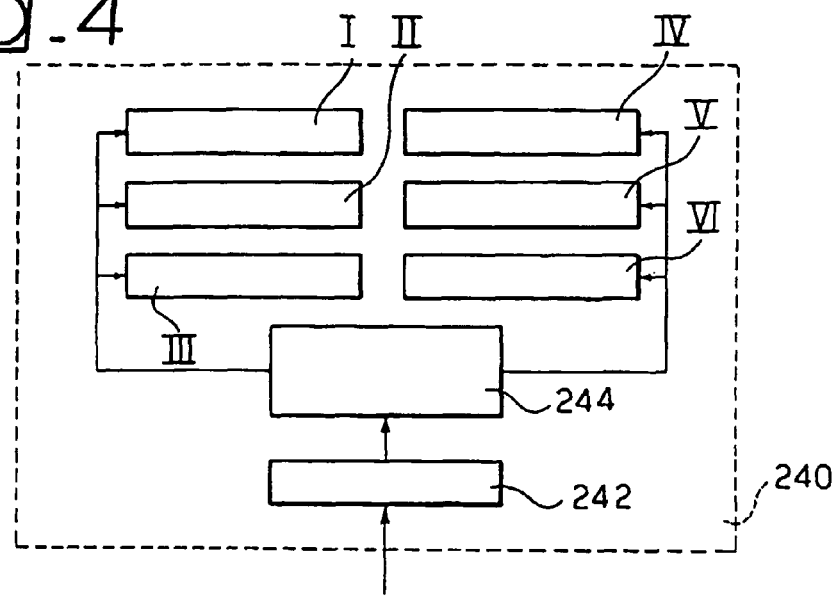

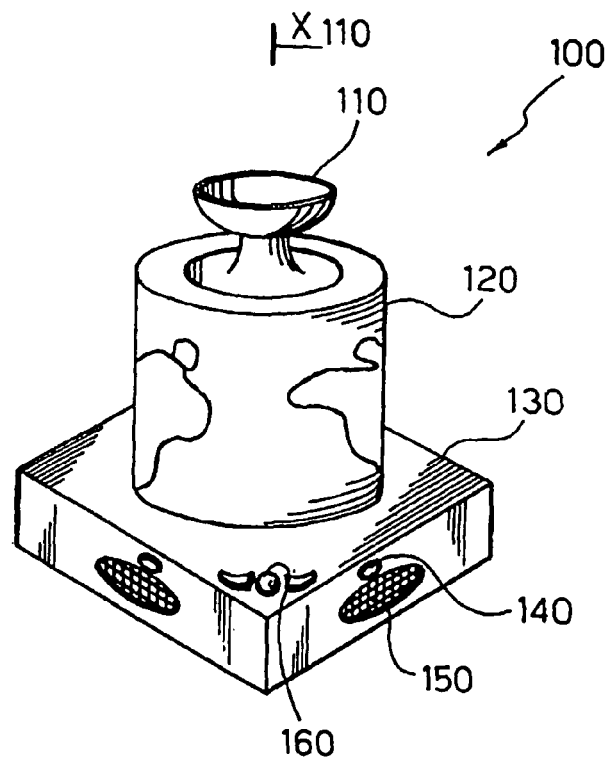
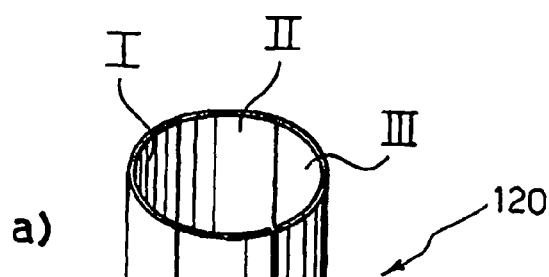
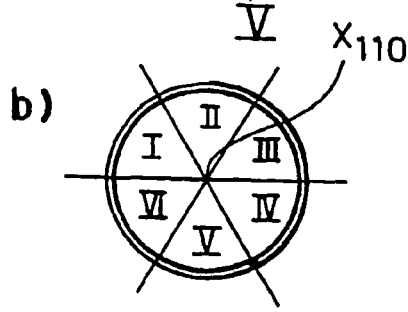

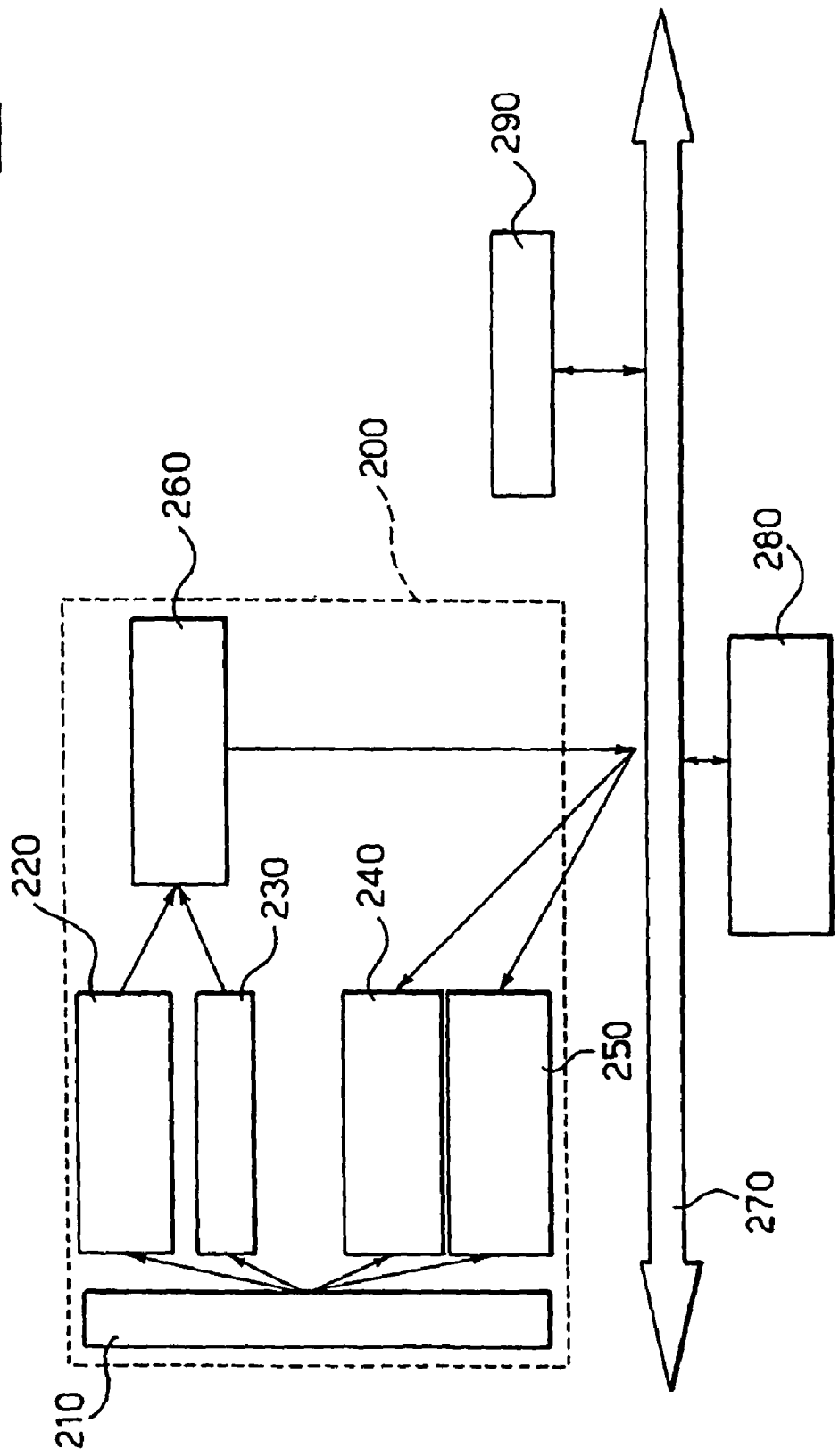

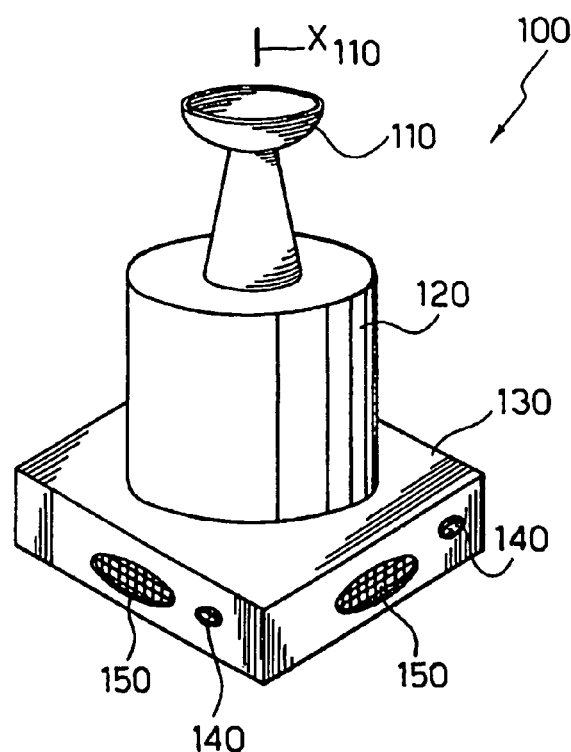
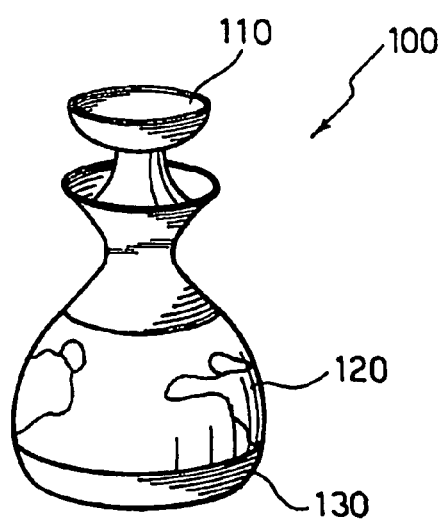

DEVICE FOR VIEWING IMAGES, SUCH AS FOR VIDEOCONFERENCE FACILITIES, RELATED SYSTEM, NETWORK AND METHOD OF USE

CROSS REFERENCE TO RELATED APPLICATION

This application is a national phase application based on PCT/IB2003/006152, filed Dec. 23, 2003, the content of which is incorporated herein by reference.

FIELD OF THE INVENTION

The present invention relates to devices for viewing images.

The invention was devised focusing in particular on its possible application in videoconferencing facilities. However, reference to this possible field of application is not to be construed as limiting the scope of the invention, which is wholly general.

DESCRIPTION OF THE PRIOR ART

Currently available videoconference installations or facilities constitute a means to involve in conferences and meetings participants who are physically situated in different locations. This takes place by means of a connection on a telecommunications network and with dedicated equipment which tries to recreate in participants the feeling that they are all simultaneously in the same place.

To make yet more realistic the experience of participating in a videoconference, with a full immersion feeling, various solutions have recently been devised which tend to obtain a "panoramic" image, for instance by means of anamorphic optics.

In this regard, a possible example is the TotalView product by the company BeHere, which uses a video camera with a set of anamorphic lenses substantially corresponding to the solutions described in the patent documents U.S. Pat. Nos. 6,539,547 and 6,515,696.

Both these documents therefore pay particular attention to the action of obtaining the images and storing them at the server level.

In regard to viewing the images, they are to be reproduced on one or more rectangular screens/viewers.

In particular, the document U.S. Pat. No. 6,539,547 extracts from the annular image obtained a viewing portion which is then transmitted in order to view a rectangular portion thereof. Users can control in dynamic and interactive fashion the rectangular display portion: in any case, it is presented using one or more rectangular and planar display screens, for instance of the liquid crystal type.

Other documents describing techniques for obtaining panoramic images are, for example, EP-A-0 695 085 (which describes a system for obtaining panoramic images comprising a lens and a fibre optic assembly) and the document JP 713 5646 (which describes a system for obtaining panoramic images with multiple cameras, and displaying them on a plurality of television monitors). The U.S. patent application US-A-2002/0021353 discloses a solution providing for the subdivision of a panoramic video image obtained by means of streaming into several panoramic sub-images which the user can choose with a browsing function.

SUMMARY OF THE INVENTION

The Applicant notes that there is a need to provide, in particular in view of possible use in videoconference facilities, a device for viewing images (possibly integrated with an audio reproduction function) that is capable of improving the realistic feeling of the reproduction. This should be done focusing in particular to the capability of obtaining a device with reduced dimensions and costs, easily transported and installed in household environments or similar environments (for instance offices or workstations not specifically configured as spaces dedicated to videoconferences) overcoming the intrinsic limitations of the aforementioned prior art devices.

The object of the present invention is completely to meet the set of requirements set out above.

According to the present invention, said object is achieved thanks to a device having the characteristics specifically set out in the claims that follow. The invention further relates to a system, a network, and a corresponding method of use.

According to a preferred embodiment of the invention, a substantially continuous viewing surface is provided which has a plurality of directions of frontal observation distributed in continuous fashion in an angular field of observation.

Preferably, the aforesaid angular field of observation is no smaller than 180°, and, preferably, substantially equal to 360°. The viewing surface in question is typically a surface with single curvature or double curvature, in preferred fashion a convex surface and, at least in part, having cylindrical shape.

Reference to a—substantially—continuous viewing surface is meant to take into account the fact that, in some possible embodiments, the surface in question can be constituted by multiple distinct viewing elements joined to each other with minimum discontinuities between the respective viewed image portions.

It will be appreciated that, although they can be observed by multiple directions, traditional viewing devices (such as normal television screens or the monitors of personal computers) have in any case a single frontal observation direction, generically orthogonal to the overall plane of extension of the screen. This holds true even when (as is the case for most cathode ray tube screens) the viewing surface has a slight curvature. This curvature is usually double (i.e. both in the horizontal and in the vertical direction), while some types of television screens have a single curvature, in the horizontal plane only, whilst the vertical section of the screen is substantially rectilinear.

The prior art solutions entailing the use of multiple traditional television screens give rise to a system that has multiple frontal observation directions (usually one for each screen in use). The related viewing surface, however, has a generally polygonal profile, with vertices (and hence discontinuities) in correspondence with the areas of junction between multiple substantially planar screens, and the related frontal observation directions are not distributed continuously (but rather discretely) in an angular field of observation.

It will be appreciated that the above also holds true for panoramic cinema facilities (occasionally called "Cinerama"), which entail the use of a plurality of convex projection screens positioned along a cylindrical surface, each of which is used to project a respective image portion starting from a projector located in a diametrically opposite position. Although they are curved, each of the screens in question allows only one respective direction of frontal observation (directed radially relative to the screen, since it is the direction along which the projection is performed).

In this case, too, the viewing surface usually has discontinuities in correspondence with the union areas between adjacent screens (where, by necessity, the projectors must be placed). Moreover, in this case too the directions of frontal observation of the various screens are discrete and hence they are not distributed continuously in an angular field of observation: this is confirmed by the fact that panoramic cinema facilities impose, for a correct utilisation, a central positioning of the viewers.

The solution described herein therefore allows to provide (not only in view of possible use in videoconference facilities, but also in reference to different kinds of media fruition) a device for viewing images, which may be integrated with an audio reproduction function and capable of improving the realistic feel of the reproduction. All within the scope of a device of reduced dimensions and cost, easily transported and installed in household environments or similar environments such as offices or work stations not specifically configured as spaces dedicated to videoconferences.

BRIEF DESCRIPTION OF THE ACCOMPANYING DRAWINGS

Figure 5:
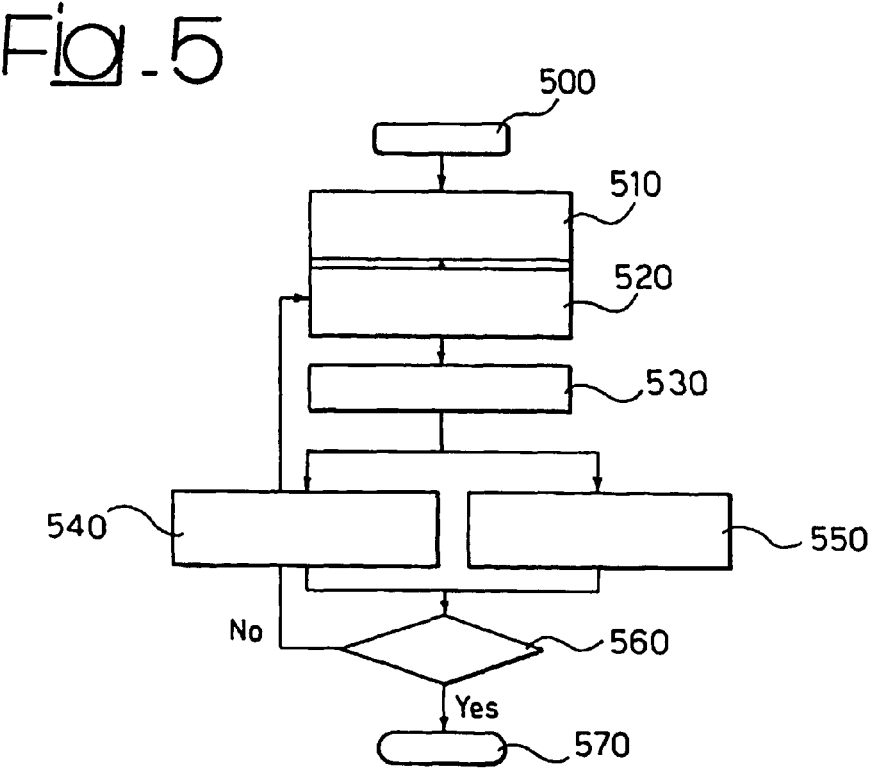

The invention shall now be described, purely by way of non limiting example, with reference to the accompanying drawings, in which:

FIG. 1 is a general perspective view of a possible embodiment of a device according to the invention, FIG. 2 is a block diagram representing the organisation of the device of FIG. 1 at the system level, FIG. 3, comprising two parts designated respectively as 3a and 3b, shows construction details of a display module usable in the device of FIG. 1, FIG. 4 schematically shows the possible driving modes of the viewing unit of FIG. 3, FIG. 5 is a possible flowchart relating to the operation of the device described herein, and FIGS. 6 and 7 show two possible embodiment variants of the device described herein.

DESCRIPTION OF PREFERRED EMBODIMENTS OF THE INVENTION

FIG. 1 shows, purely by way of non limiting example, a first embodiment of a device 100 essentially configurable as a multimedia system for shooting and reproducing audio-visual signals.

For the sake of clarity, but in no way limiting the scope of the invention, it can be presumed that the device 100 is destined to be positioned at the centre of a table used for a teleconference.

To this end, the device 100 is provided with a system for shooting panoramic images comprising a lens 110 with anamorphic optics able to shoot an annular image extending 360° about its main axis $X_{110}$. In the situation illustrated herein, and with referring to the most common condition of use, it will be supposed that the axis $X_{110}$ is oriented in the vertical direction.

The anamorphic optics designated by the reference number 110 are generally linked to a television camera or video camera that is able to process the aforesaid annular image, generating a corresponding outgoing video signal. The television/video camera is not shown in the drawings, since it is located within a display unit 120 which will be extensively described below.

As stated in the introductory part of the present description, systems for obtaining images of this kind are well known in the art, which makes it superfluous to provide a detailed description herein.

In the embodiment illustrated herein, the device 100 comprise a body 130 serving as a base, typically having a prismatic shape (for instance a prism with square base) within which is located the electronics for processing the video signal obtained by means of the anamorphic optics 110, a power supply of the device, as well as the various network interfaces (which can be, for instance, interfaces such as ADSL, Wi-Fi, . . . ) which enable to connect the device 100 to a computer network such as, typically, the Internet.

Above the base body 130 is positioned a viewing unit 120 which can be obtained with different technologies (for instance, liquid crystals or LCD, or flexible OLED, etc.). An important characteristic of this viewing unit is that it has a surface (which may be individual or constituted by multiple adjacent portions of surface joined together without giving rise to appreciable discontinuities) with globally cylindrical development and an angular development substantially equal to 360° (said development and said angular extension can preferably be referred to the same main axis $X_{110}$ of the anamorphic optics 110).

In the remainder of the present description, reference shall be made to a viewing surface 120 having an angular extension of the order of 360°, since it represents the currently preferred embodiment of the invention.

It is readily apparent, however, that the invention can be implemented in simplified form with viewing surfaces having a much smaller angular extension, always retaining the ability to produce images with such panoramic characteristics as to give the users of the system a very realistic impression of immersion in the environment where the objects shown on the viewing unit 120 are located.

Clearly, in the videoconference application, the environment in question is the environment in which the remote partners of the videoconference are located.

It has been verified that, whilst the best results in terms of realism of reproduction are obtained with a viewing surface 120 extending 360°, good realism impressions are still obtained with viewing surfaces 120 having smaller angular extensions, down to 180°.

Below this value, for example referring to angular extensions of 90 or 60°, the realism effect tends to be reduced more and more markedly.

In any case, the important characteristic of the viewing surface 120 is that it is constituted by a substantially continuous display surface (as stated, the surface can in fact be subdivided in multiple sub-surfaces which join together without appreciable discontinuities) which has a plurality of directions of frontal observation distributed continuously in an angular field of observation: a more extensive discussion of this concept is provided in the introductory part of the present description.

As stated, in the currently preferred embodiment, the viewing surface 120 has a plurality of directions of frontal observation, distributed continuously in an angular field of observation with amplitude of 360°: in practice, they are all the directions that converge towards the central axis $X_{110}$.

This value corresponds to the field of observation of the imaging system 110. The possible identity of the values of angular field of imaging and reproduction enables the anamorphic optics 110 and the viewing surface 120 to be advantageously positioned in such a way as to have a common axis, represented in the example illustrated herein by the axis $X_{110}$.

This arrangement is particularly advantageous when adjusting the device 100, since it allows (using an operating mode currently provided in teleconference facilities) to present on the viewing surface 120 the local image obtained by means of the anamorphic optics 110.

Without thereby limiting the scope of the invention, the experiences conducted by the Applicant demonstrate that the device 100 can typically have the dimensions of a normal television/personal computer. This means that the base body 130 has sufficient dimensions to house a set of circuits and components that is substantially comparable to the one normally comprised in a currently produced personal computer.

Naturally, it will be appreciated that the prismatic shape, and in particular the square cross section in plan view, illustrated herein, are shown purely by way of example.

In general, the prismatic configuration has the advantage of allowing to position in correspondence with each side or face of the base 130:
- a microphone 140 preferably having directional characteristics, to be able to detect the audio signals that come from the corresponding portion of the surrounding space, and
- in dual fashion, a corresponding loudspeaker 150 which transmits towards the space that faces it the sound signal corresponding to the part of image displayed in the surface portion 120 positioned immediately above the speaker.

Naturally, the number of faces of the base body 130 (which can naturally also have cylindrical shape) can be selected at will. The selection of a body 130 having three or four faces (each equipped with a respective microphone 140-loudspeaker 150 pair) is currently considered preferential.

Usually, a control system 160 is normally provided, which allows the user (usually operating through a remote control, as takes place in currently used videoconference facilities) to command the execution of all activation/deactivation, adjustment functions, etc. needed to set up the videoconference call and to carry it out.

For example, whether it be mounted on the base 140 or whether it be provided through a remote control, the control system 160 can comprise control organs (push-buttons, rotating balls, "joystick", etc.) which allow to rotate and/or adjust the image reproduced on the surface 120 in intuitive fashion.

This, for example, to make the image reproduced on the surface 120 rotate about the axis $X_{110}$ in such a way as to enable a determined user to move in front of him/her the image (and, in co-ordinated fashion, the audio signal) relating to a portion of the panoramic image receive that (s)he wants to observe with particular attention: for instance, it may be the image (and the sound) relating to one of the videoconference partners with whom a determined user is conversing at that time.

Experiences show that this usage mode is particularly suggestive and such as to overcome the mechanism of psychological rigidity linked to the use of the current videoconference facility.

The block diagram of FIG. 2 shows the system architecture usually associated to the device 100 shown in FIG. 1.

The architecture, globally designated by the reference number 200, provides for a command module 210 which is essentially slaved to the unit or units globally designated by the reference number 160 in FIG. 1. The module 210 therefore supervises some system functions such as: volume adjustment, counterpart selection, image rotation, etc.

The reference 220 in the diagram of FIG. 2 designates the optical panoramic optical imaging system (for instance with anamorphic optics) whereto is associated in dual fashion a module 230 for "capturing" the audio signals whereto are connected the various microphones 140.

The joint output of the modules 220 and 230 is a multimedia signal (or rather a set of signals whose number depends on the specific embodiment details) capable of being fed in the form of an audio/video stream towards a processing module 260 serving as an interface (wired or wireless) towards the network 270 constituted, for instance, by the Internet.

Specifically, the audio-video streams produced by the modules 220 and 230 are sent to the module 260 which encodes and transmits their multimedia contents to a remote client 290 with which the network 270 communicates.

The network in question can be the Internet with fixed or mobile access. Alternatively, it can be a local network of the LAN type.

In particular, the module 260 is able to transmit/receive information in the same wireless fashion, for instance by means of a Wi-Fi connection.

The module 260 comprises the transformation modules (known in themselves) which allow to transform and subject to anamorphic processing the image 220 captured by the sensor 110 in such a way as to originate a rectangular, panoramic image on 360°, capable of being transmitted.

In the embodiment illustrated herein—which is, in fact, an example—the device 100 communicates in videoconference with a homologous device 290 located remotely.

The reference 240 thus designates a panoramic display module which receives the panoramic video signal sent by the dual remote client 290 to display it on the respective surface 120.

In corresponding fashion, one or more audio streams coming from the remote terminal 290 connected in videoconference are reproduced by means of the loudspeakers 150 in such a way as to create a complete audio-visual immersion effect.

This occurs by means of an audio processing module designated by the reference number 250 which is also destined to co-operate with the display module 240 in such a way as to assure the spatial correspondence between the image presented by the various portions of the display surface 120 and the corresponding audio signal irradiated by the loudspeakers 150 distributed around the base 130 of the device 100.

The reference 280 in the diagram of FIG. 2 designates a communication server whose main purpose is to facilitate communication between two networked homologous devices 100 allowing users connected to the service to know who are the other users with whom they are videoconferencing and providing the necessary means to establish the communication without requiring the implementation of particular procedures by the calling user(s) and by the called user(s).

FIG. 3 shows, in a general perspective view (FIG. 3a) and a plan view (FIG. 3b) a possible organisation of the viewing surface 120 which once again is assumed to extend for an angular field of 360°.

As stated in the introductory part of the description, different technological solutions can be employed to obtain a viewing surface of this kind. A currently preferred solution provides for the use of flexible surface viewing elements, able to be applied on a support body (not specifically shown in FIG. 3) of cylindrical/tubular shape.

For example, it was possible to verify that the angular coverage of 360° can easily be achieved using six viewing elements I through VI, each having a general bent tile shape and an angular extension (always referred to the main central axis of symmetry of the viewing surface, represented by the axis $X_{110}$) of 60°.

Display elements of this kind are produced and available commercially thanks to the technologies known as OLED and Flexible OLED (Organic Light Emission Diode), using, for instance, TFT (Thin Film Transistor) components which allow to inject electron flows through thin organic films which emit energy in the visible range.

The main characteristic of these components for purposes of their use within the solution described herein is the capability, available to manufacturers, to use in the fabrication process a flexible substrate, hence suitable for producing screens which are capable of being bent and flexed even with quite small radii of curvature.

For example, the Japanese company Toshiba currently provides 9 inch diagonal active matrix TFT viewing units capable of being curved and bent up to a radius of curvature of 18 cm.

For instance, using six viewing elements of this kind, each with a radius of curvature of about 18 cm., it is possible to obtain a viewing surface 120 with a diameter of about 36 cm, thus with a circumference (corresponding to the base length of the annular image) in the order of 113 cm. Since each element has an aspect ratio of 1:4 and referring to 9 inch diagonal (about 23 cm.) elements, the rectangular panoramic image extends on the circumference, in fact, for a value in the order of 113 cm.

In this case (making reference now to FIG. 4), the rectangular panoramic video stream is presented on the six viewing elements (designated by the Roman numbers I through VI also in the plan view of FIG. 3b).

In this case, the panoramic video signal fed into the module 240 in correspondence with an input module 242 is transferred to a multi-screen board 244 which is able to generate, starting from the incoming video stream, six sub-streams each destined to be sent to one of the viewing elements I through VI.

All this with the capability of transferring the individual vertical image element from one of the modules to the immediately adjacent one according to a loop circulation logic: the "rightmost" vertical image strip in the module VI can be circularly transferred into the "leftmost" vertical portion in the module I allowing the panoramic image to rotate on the viewing unit 120 about the axis $X_{110}$ in the manner better described above.

A multi-screen board capable of being used as a multi-screen adapter board 244 is available on the market, for instance in the production of the company Colorgraphic Communications Ltd. A board of this kind is able to display images in coordinated fashion, allocating them on up to eight viewing elements.

The flowchart of FIG. 5 shows typical modes of employing a system like the system 100 of FIG. 1.

In particular, to star communicating with another remote client site provided with a homologous remote site 100, after an initial step 500, in a step 510 the user establishes (usually in automatic mode, with the aid of the communication server 280 of FIG. 2) the communication with another user to be called in videoconference. Setting up the connection entails a step 520 in which the system detects an indication of availability of the called user (in particular verifying that it is not already busy in another videoconference) and then establishing the desired connection in a step 530, having verified its feasibility.

At this point, the system starts to transmit (step 540) the panoramic audio-video signal obtained locally by means of the anamorphic optics 110 and the microphones 140 towards the videoconferencing partner; all this receiving from it, in complementary fashion (in a step designated by the reference number 550) the remote audio-video signal destined to be presented on the visualisation surface 120 and through the speakers 150.

The communication continues until one of the two users wishes to break it off. The outcome of this step, designated by the number 560, can either be the shutdown of the system (final step 570) or a direct call to another client (step 520), capable of giving rise to a new communication based on the steps 530, 540 and 550, already described above.

FIGS. 6 and 7 schematically show some possible variants of the device 100 described above. Said variants are capable of further improving the ergonomic and/or utilisation characteristics of the device.

For example, according to the solution schematically shown in FIG. 6 the surface 120 has "touch screen" characteristics, thereby enabling the user to perform command operations directly by touching the surface itself.

Moreover, FIG. 6 shows that the system for detecting or capturing the image (anamorphic optics 110 and elements associated thereto) can be mounted, instead of in a substantially internal position relative to the surface 120 (as is the case in the embodiment shown in FIG. 1), in a projected or extended position relative to said surface. This choice can be advantageous for the purposes of carrying out the image shooting operation.

The schematic presentation of FIG. 7 shows that the structure of the device 100 described above can be subject to numerous shape variants, also dictated by the desire to provide the device 100 as a whole with particular design characteristics. FIG. 7 shows that the display surface 120 can also assume double curvature surface characteristics, thus exhibiting a vertical section profile which, instead of being rectilinear, as is the case of the solutions shown in FIGS. 1 and 6, is curved. A solution of this kind can be achieved with relative ease, taking into account the general flexibility of the elements such as the elements I through VI in FIG. 3.

According to yet other variants of the invention, the imaging unit (anamorphic optics 110 and devices associated thereto) can be a self-contained unit, separate from the viewing surface 120 and from the base 130 that supports it.

For example, the imaging unit designated herein as 110 can be located remotely and be connected to the remaining parts of the device 100 through a remote connection, for instance of the wireless type (UWB network).

As an additional example, although the present description has referred to an image detection optics 110 of the anamorphic type, it is readily apparent that this choice is in no way imperative for the purposes of implementing the invention.

It is obvious that the different possible variants illustrated and/or outlined herein are freely applicable and interchangeable between different embodiments of the device according to the invention.

It will also be appreciated that, in addition to the possible application to a videoconferencing context, the viewing unit 120 described herein is capable of being used for viewing images of different origin from a videoconference context. They can be constituted, for example, by a television signal (for example of a digital and/or cable TV signal), or by a signal derived from a DVD reader or the like. In particular, it will be appreciated that the criteria for viewing the images illustrated herein ideally match multi-channel techniques for reproducing audio signals such as SACD 5.1 or DVD-Audio 5.1.

It is therefore wholly evident that, without altering the principle of the invention, the construction details and the embodiments may be widely varied from what is described and illustrated herein, without thereby departing from the scope of the present invention, as defined in the appended claims.

The invention claimed is:
1. A videoconference apparatus comprising:
an electronic device for viewing images comprising:
a viewing surface, said viewing surface being substantially continuous and having a plurality of directions of frontal observation distributed continuously in an angular field of observation; and an imaging unit for capturing panoramic images, said imaging unit and said viewing surface being mounted on a common support, the videoconference apparatus further comprising at least a network interface configured to:
  transmit to a homologous videoconference apparatus the panoramic images captured by said imaging unit; and
  receive from said homologous videoconference apparatus image signals to be displayed on said viewing surface.

2. The videoconference apparatus as claimed in claim 1, wherein said angular field of observation is no smaller than 180°.

3. The videoconference apparatus as claimed in claim 1, wherein said angular field of observation is substantially equal to 360°.

4. The videoconference apparatus as claimed in claim 1, wherein said viewing surface is a surface with single curvature.

5. The videoconference apparatus as claimed in claim 1, wherein said viewing surface is a surface with double curvature.

6. The videoconference apparatus as claimed in claim 1, wherein said viewing surface is a convex surface.

7. The videoconference apparatus as claimed in claim 1, wherein said viewing surface has, at least in part, cylindrical shape.

8. The videoconference apparatus as claimed in claim 7, wherein said viewing surface is substantially cylindrical.

9. The videoconference apparatus as claimed in claim 1, wherein said viewing surface comprises at least a flexible, curved viewing element.

10. The videoconference apparatus as claimed in claim 1, wherein said viewing surface comprises a plurality of viewing elements.

11. The videoconference apparatus as claimed in claim 10, comprising a module for processing video signals capable of being fed with an incoming video stream and capable of dividing said stream into a plurality of sub-streams, each of which is sent to one of said display elements of said plurality of sub-streams.

12. The videoconference apparatus as claimed in claim 1, wherein said viewing surface is obtained with a LED, OLED or TFT viewing structure.

13. The videoconference apparatus as claimed in claim 1, comprising a processing module associated therewith capable of being fed with a stream of video signals representing a panoramic image having an extension in the direction of the width, said processing module being capable of varying the position of representation of said panoramic image on said viewing surface with a sliding effect of said panoramic image in the direction of said width.

14. The videoconference apparatus as claimed in claim 1, comprising at least a loudspeaker for the reproduction of an audio signal associated with said viewing surface.

15. The videoconference apparatus as claimed in claim 14, comprising a plurality of loudspeakers distributed in said angular field.

16. The videoconference apparatus as claimed in claim 15, comprising a display module for driving the viewing of an image on said viewing surface and an audio reproduction module for reproducing respective audio signals through the loudspeakers of said plurality.

17. The videoconference apparatus as claimed in claim 16, wherein said display module and said audio reproduction module are operatively connected to convey to each of the loudspeakers of said plurality a respective audio signal referred to the portion of image displayed in a portion of said viewing surface adjacent to said loudspeaker.

18. The videoconference apparatus as claimed in claim 1, wherein said imaging unit comprises anamorphic optics.

19. The videoconference apparatus as claimed in claim 1, wherein said imaging unit and said viewing surface have a common main axis.

20. The videoconference apparatus as claimed in claim 1, wherein said imaging unit is, at least in part, located in an inner position relative to said viewing surface.

21. The videoconference apparatus as claimed in claim 1, wherein said imaging unit is located in a distanced position relative to said viewing surface.

22. The videoconference apparatus as claimed in claim 1, wherein said device comprises at least an interface configured to allow communication with said homologous device by means of a communication network.

23. The videoconference apparatus as claimed in claim 22, wherein said communication network is selected from the group of a wide area network, the internet and a WLAN network.

24. The videoconference apparatus as claimed in claim 22, wherein said at least one interface is configured to allow a wireless communication.

25. A videoconference facility comprising at least the videoconference apparatus as claimed in claim 1.

26. A videoconference network comprising at least a first and a second videoconference apparatus as claimed in claim 1, capable of connecting with each other.

27. A videoconference method, comprising:
  connecting, via a network, a first videoconference apparatus with a second videoconference apparatus located at a remote site relative to said first videoconference apparatus, wherein said first and second videoconference apparatus each comprises:
    a viewing surface, said viewing surface being substantially continuous and having a plurality of directions of frontal observation distributed continuously in an angular field of observation; and
    an imaging unit for capturing panoramic images, said imaging unit and said viewing surface being mounted on a common support, the videoconference apparatus further comprising at least a network interface configured to:
      transmit to a homologous videoconference apparatus the panoramic images captured by said imaging unit; and
      receive from said homologous videoconference apparatus image signals to be displayed on said viewing surface;
  generating a stream of video data representative of a panoramic image at each of said first and second videoconference apparatus;
  feeding the stream of video data generated at each of said first videoconference apparatus to the viewing device of said other videoconference apparatus, causing said panoramic image generated at each of said first and second videoconference apparatus to be displayed on said viewing surface of said other videoconference apparatus.

* * * * *